(12) United States Patent
Ray

(10) Patent No.: US 6,352,601 B1
(45) Date of Patent: Mar. 5, 2002

(54) SELF-ADHERING ICE PROTECTOR

(75) Inventor: Robert W. Ray, Lewisburg, WV (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 08/365,378

(22) Filed: Dec. 27, 1994

(51) Int. Cl.$^7$ ............................................... B32B 31/00
(52) U.S. Cl. .................. 156/71; 244/134 A; 244/134 E
(58) Field of Search .................... 244/134 A, 134 E; 156/71

(56) References Cited

U.S. PATENT DOCUMENTS

| | | | |
|---|---|---|---|
| 2,957,662 A | 10/1960 | Hess ........................... | 244/134 |
| 3,604,666 A | 9/1971 | Achberger .............. | 244/134 A |
| 4,246,303 A | * 1/1981 | Townsend ..................... | 428/31 |
| 4,386,749 A | 6/1983 | Sweet et al. ............ | 244/134 D |
| 4,388,355 A | * 6/1983 | Ikemizu ....................... | 428/31 |
| 4,494,715 A | 1/1985 | Weisend, Jr. ............ | 244/134 A |
| 4,875,644 A | 10/1989 | Adams et al. .......... | 244/134 R |
| 5,031,773 A | * 7/1991 | Manico et al. .............. | 206/455 |
| 5,035,934 A | 7/1991 | Tomiyama et al. | |
| 5,129,598 A | 7/1992 | Adams et al. .......... | 244/134 D |
| 5,152,480 A | 10/1992 | Adams et al. .......... | 244/134 D |
| 5,219,626 A | * 6/1993 | Irrgang ......................... | 428/31 |
| 5,314,145 A | 5/1994 | Rauckhorst, III ....... | 244/134 A |
| 5,318,251 A | 6/1994 | Bergh | |
| 5,326,605 A | 7/1994 | Ono et al. | |

FOREIGN PATENT DOCUMENTS

WO           9111891           8/1991

OTHER PUBLICATIONS

Patent Abstracts of Japan. Publication No. JP5170053, Date Jul. 9, 1993; Application No. JP910343452, Date Dec. 12, 1991. vol. 17, No. 580 (M–1500), Ab. Date: Oct. 21, 1993 Pat: A5170053, Patentee: Railway Technical Res. Inst. Inventor: Murata Hitoshi et al.

European Search Report, Date Apr. 4, 1996.
ASTM Designation: D 3574–91; Standard Test Methods for Flexible Cellular Materials–Slab, Bonded, and Molded Urethane Foams; pp. 164–170.
ASTM Designation: D 1876–93; Standard Test Method for Peel Resistance of Adhesives (T–Peel Test); pp. 105–107.
Avery Dennison, Product Information Bulletin, FasTape(TM) 1185 UHA (TM) Transfer Tape, Mar. 1993, p. 1.
Adhesive Research, Inc., Product Information, ARclad(R) S–7761, 1 page.
Adhesives Research, Inc., Product Information ARclad(R) S–6450, 1 page.
Mactac, Performance Guide IB–1200, 1 page.
3M Industrial Specialities Div., Product Information, Scotch (TM) Joining Systems, A–35 Acrylic Adhesive Family, Dec. 1990, 2 pages.
Straub Design Co., Product Information, WL–30 heat Bond Laminator, 1 page.
3M Industrial Specialties Div., Prod. Info., Scotch (TM) brand Gasket Bonding Tape Systems, 4 pages.
Adhesive Research Europe B.V., Prod. Info., ARclad(R) Double–coated Pressure Sensitive Foams, 1 page.
Avery Dennison Specialty Tapr Div., Product Selction Chart, 8 pages.

* cited by examiner

*Primary Examiner*—Mark A. Osele
(74) *Attorney, Agent, or Firm*—The B. F. Goodrich Company; James M. Rashid

(57) ABSTRACT

The invention relates to the field of ice protectors for inhibiting atmospheric ice accumulation on aircraft structures. More particularly, the invention relates to the bonding of an ice protector to an aircraft structure. According to an aspect of the invention, a device for inhibiting atmospheric ice accumulation on an aircraft structure is provided comprising a flexible ice protector, an intermediate layer bonded to the flexible ice protector, and a pressure sensitive adhesive layer bonded to the intermediate layer. The pressure sensitive adhesive layer defines a bonding surface that bonds the ice protector to the aircraft structure.

20 Claims, 3 Drawing Sheets

SELF-ADHERING ICE PROTECTOR

BACKGROUND OF THE INVENTION

The invention relates to the field of ice protectors for inhibiting atmospheric ice accumulation on aircraft structures. More particularly, the invention relates to the bonding of an ice protector to an aircraft structure.

Atmospheric ice accumulation on the ground and in flight has long been recognized as a serious hazard. Various de-icing and anti-icing devices have been developed to safely remove or prevent unwanted ice accumulations on the external surfaces of aircraft. Many of these devices comprise flexible ice protectors that are bonded to existing external surfaces using a removable adhesive. An ice protector based on this concept may thus be removed and replaced if it fails or becomes damaged. A very common adhesive used for this purpose is catalogue number 1300L available from the Minnesota Mining and Manufacturing Company, St. Paul, Minn., U.S.A. Previous ice protectors that have been applied in this manner include elastomeric pneumatic de-icers, elastomeric electrothermal de-icers and anti-icers, and some electromechanical de-icers.

Installation of an ice protector using an adhesive such as 1300L involves applying the adhesive to the aircraft structure and to a bonding surface of the ice protector. The adhesive is permitted to dry and then activated by wiping it with a solvent such as toluene or methyl-ethyl-ketone (MEK). The adhesive behaves as a contact adhesive, and the ice protector is then pressed against the aircraft structure beginning with a selected area (such as a leading edge) and subsequently with increasing distance from the selected area. Rollers are preferably used to insure intimate contact between the two adhesive layers.

In spite of the wide-spread acceptance of this prior technique, a stronger and more durable adhesive interface between the ice protector and the aircraft structure is generally desired. The adhesive interface must withstand attacks of sun, rain, de-icing fluids, hydraulic fluids, turbine oils, and other degrading elements. In addition, prior commonly used adhesives have a very limited shelf life, and often contain toluol and MEK, as well as other potentially toxic chemicals. Various government agencies have placed severe restrictions on methods of shipping these adhesives, and on how the adhesives and solvents may be used. Finally, prior adhesives require several hours to cure before the ice protectors may be activated. Imposing several hours downtime on commercial operators is undesirable.

Though prior adhesives are certainly safe and suitable for attaching ice protectors to aircraft structures, an adhesive having more desirable characteristics is desired. In particular, a strong and durable adhesive with good environmental resistance is generally desired. An adhesive having longer shelf life, and not containing or requiring use of solvents in the field is generally desired. Finally, an adhesive that bonds an ice protector in a manner that immediately allows the ice protector to be operated is desired. The specific problem at hand is to provide a self-adhering flexible ice protector having the enumerated adhesive characteristics.

SUMMARY OF THE INVENTION

According to an aspect of the invention, a device is provided for inhibiting atmospheric ice accumulation on an aircraft structure, comprising:

a flexible ice protector;

an intermediate layer bonded to the flexible ice protector, the intermediate layer having a lesser modulus of elasticity than the flexible ice protector;

a pressure sensitive adhesive layer bonded to the intermediate layer, the pressure sensitive adhesive layer defining a bonding surface that bonds to the aircraft structure.

According to another aspect of the invention, a device is provided for inhibiting atmospheric ice accumulation on an aircraft structure, comprising:

a flexible ice protector;

an intermediate layer disposed between the flexible ice protector and the aircraft structure;

an intermediate adhesive layer bonding the intermediate layer to the ice protector, the intermediate layer and the ice protector being comprised of different materials adjacent the intermediate adhesive layer, the intermediate adhesive layer being particularly suited to bond the intermediate layer to the ice protector;

a pressure sensitive adhesive layer that bonds the intermediate layer to the aircraft structure, the pressure sensitive adhesive layer being particularly suited to bond the intermediate layer to the aircraft structure.

According to yet another aspect of the invention, a method is provided for attaching a flexible ice protector to an aircraft structure, comprising the steps of:

bonding the flexible ice protector to the aircraft structure by means of an intermediate layer bonded to the ice protector, the intermediate layer being more compressible than the ice protector and having a pressure sensitive adhesive layer on a side of the intermediate layer opposite the ice protector that bonds the intermediate layer to the aircraft structure.

The invention provides a self-adhering ice protector having a strong and durable adhesive with good environmental resistance. It provides an adhesive having longer shelf life than prior adhesives, and that does not contain or require use of solvents in the field. Finally, the invention provides an adhesive that bonds an ice protector in a manner that immediately allows the ice protector to be operated.

DETAILED DESCRIPTION

Figure 1:
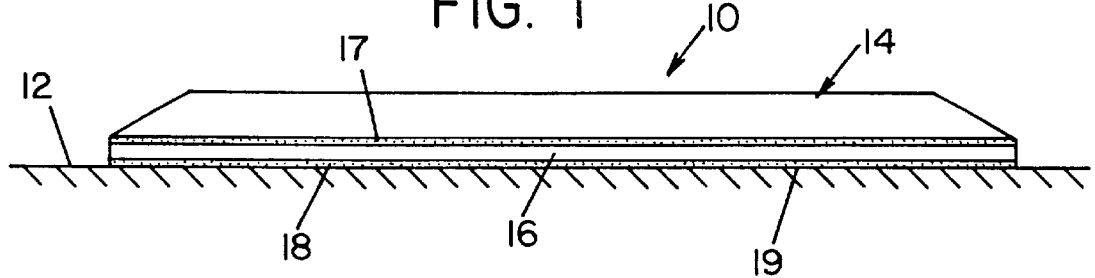
FIG. 1 depicts a device for inhibiting atmospheric ice accumulation on aircraft structure according to the invention.

Various embodiments of the invention are depicted in FIGS. 1–4, wherein like numerals are employed to designate like parts. Referring to FIG. 1, a device 10 according to an aspect of the invention for inhibiting atmospheric ice accumulation on an aircraft structure 12 comprises a flexible sheet-like ice protector 14, an intermediate layer 16 bonded to the flexible sheet-like ice protector 14 by an intermediate adhesive layer 17, and a pressure sensitive adhesive layer 18 bonded to the intermediate layer 16. According to an aspect of the invention, the intermediate layer 16 has a lesser modulus of elasticity than the flexible sheet-like ice protector 14. The pressure sensitive adhesive layer 18 defines a bonding surface 19 that bonds to the aircraft structure 12. The aircraft structure 12 may be constructed from a metal, such as aluminum, or a fiber reinforced plastic. As previously described, prior rubber based adhesives used to bond ice protectors utilize solvents such as toluene and methyl-ethyl-ketone (MEK), and eliminating or minimizing the use of such solvents is environmentally desirable. As used herein, "pressure sensitive adhesive" means an adhesive that bonds to a surface upon application of pressure without the use of solvents to apply or activate the adhesive, and includes two-sided adhesive transfer tape. Various examples of suitable adhesives are provided in the following description. The pressure sensitive adhesive layer 18 eliminates the need for rubber and solvent based adhesives. In addition, the pressure sensitive adhesive facilitates installing the ice protector 10 in the field.

According to another aspect of the invention, the intermediate layer 16 disposed between the flexible ice protector 14 and the aircraft structure 12 acts as a flexible tie-in layer. The intermediate layer 16 and the ice protector 14 are comprised of different materials adjacent the intermediate adhesive layer 17. The intermediate adhesive layer is selected to be particularly suited to bond the intermediate layer 16 to the ice protector 14. The pressure sensitive adhesive layer 18 may be selected to be particularly suited to bond the intermediate layer 16 to the aircraft structure 12. Such an arrangement permits maximization of the overall bond strength between the ice protector 14 and the aircraft structure 12. It also provides flexibility in choosing a combination of ice protector materials, intermediate layer materials, and adhesive layer materials in order to provide maximum bond strength and performance.

Figure 2A:
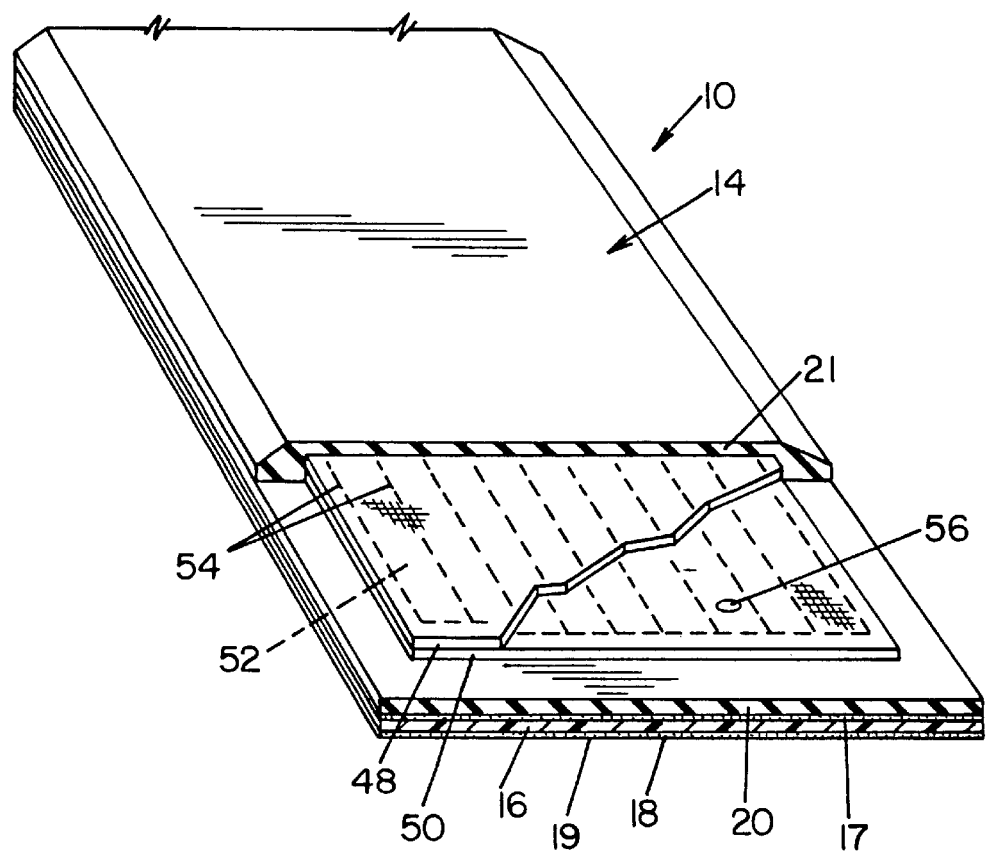
FIG. 2A depicts a pneumatic de-icer embodiment according to an aspect of the invention.

Referring now to FIG. 2A, a more detailed view of the device 10 and ice protector 14 is presented with sections broken away. In this embodiment, the ice protector 14 comprises a pneumatic de-icer. Pneumatic de-icers have inflatable passages that are inflated causing the surface to distort and break an accreted ice cap into pieces where it is swept away by a surrounding airflow. Pneumatic de-icers are very well known in the art. Two variations are generally recognized. One variation, a "sewn-type" pneumatic de-icer, is depicted in FIG. 2A. An extensible fabric layer 48 is disposed over an adjacent fabric layer 50. The fabric layers 48 and 50 are sewn together in a manner that defines a plurality of inflatable passages 52. The individual stitches 54 are represented schematically in FIG. 2A. The sewn fabric layers 48 and 50 are bonded between an elastomeric breeze-side layer 21 and an elastomeric bond-side layer 20. The breeze-side layer 21 is exposed to atmospheric icing during flight in atmospheric icing conditions. Pressurized air is periodically supplied to the inflatable passages 52 through an air connection 56, which causes the breeze-side layer 21 to distend and fracture accumulated ice. According to an aspect of the invention, the bond-side layer 20 is bonded to intermediate layer 16, and the pressure sensitive layer 18 is bonded to intermediate layer 16. The individual tubes may run parallel to either the chordwise or spanwise directions of an airfoil section. An example of a sewn-type de-icer having tubes running in both the spanwise and chordwise directions is provided in U.S. Pat. No. 4,494,715 to Weisend, Jr.

The second variation, a "tube-type" pneumatic de-icer (not shown), may also be used in the practice of the invention. According to the tube-type de-icer, the individual inflatable passages are defined by strips of extensible fabric that are rolled across the width of each strip forming a seam along the length of the tube. The tubes (substituted for fabric layers 48 and 50 of FIG. 2A) are then aligned parallel to each other and bonded between elastomeric layers similar to layers 20 and 21. Air is supplied to the tubes through one or more manifolds that run generally perpendicular to the tubes. One or more air connections supply air to each manifold. The individual tubes may run parallel to either the chordwise or spanwise directions of an airfoil section. An example of a tube-type de-icer having spanwise tubes is presented in U.S. Pat. No. 3,604,666 to Achberger. An example of a tube-type de-icer having chordwise tubes is presented in U.S. Pat. No. 2,957,662 to Hess. Suitable materials for tube-type or sewn-type pneumatic de-icers are well known in the art and include chloroprene elastomer, polyurethane elastomer, and natural rubber. Square woven and tricot woven nylon fabrics coated with these materials are also used.

Figure 2B:
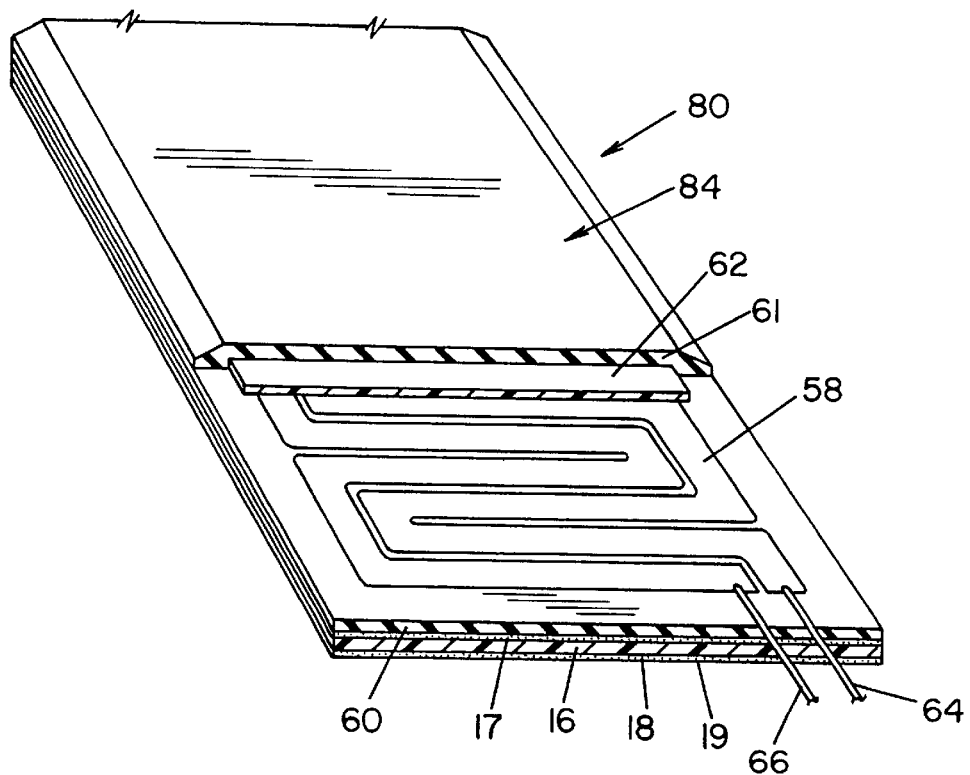
FIG. 2B depicts an electrothermal embodiment according to an aspect of the invention.

The ice protector may take many forms in the practice of the invention. Referring to FIG. 2B, a device 80 according to another aspect of the invention comprises an ice protector 84 bonded to the intermediate layer 16 by the intermediate adhesive layer 17. The pressure sensitive adhesive layer 18 is bonded to the intermediate layer 16, and defines the exposed surface 19 that bonds to the aircraft structure. In this embodiment, the ice protector 84 comprises an electrothermal heating element 58. Heating element 58 is usually bonded to a carrier layer 62. In the embodiment presented, element 58 comprises a sheet metal ribbon disposed in a serpentine-like configuration on carrier layer 62. As is known in the art, element 58 may be etched on the carrier layer 62 using a photographic process. The element 58 and carrier layer 62 are sandwiched between a bond-side layer 60 and a breeze-side layer 61. The breeze-side layer 61 is exposed to atmospheric icing during flight in atmospheric icing conditions. An electrical potential is applied across power leads 64 and 66 that are attached to element 58. The potential develops a current in element 58 which acts as an electrical resistor and generates heat. The heat conducts through the breeze-side layer and melts accumulated ice. Electrothermal de-icers and anti-icers that utilize such heating elements are very well known in the art. The bond-side layer 60, breeze-side layer 61, and carrier layer 62 are preferably formed from polymeric material which may or may not be fiber reinforced. Examples of suitable polymeric materials include chloroprene elastomer, nitrile-phenolic plastic, and polyurethane elastomer. Examples of suitable fiber reinforcements include polyester, carbon or graphite, and polyamide (Nylon® or Kevlar®) fibers, as well as natural fibers such as cotton. A propeller de-icer having a ribbon element that may be used in the practice of the invention is described in U.S. Pat. No. 4,386,749 to Sweet et al. Other types of heating elements known in the art, including wire elements and conductive layers, may also be used in the practice of the invention.

Figure 2C:
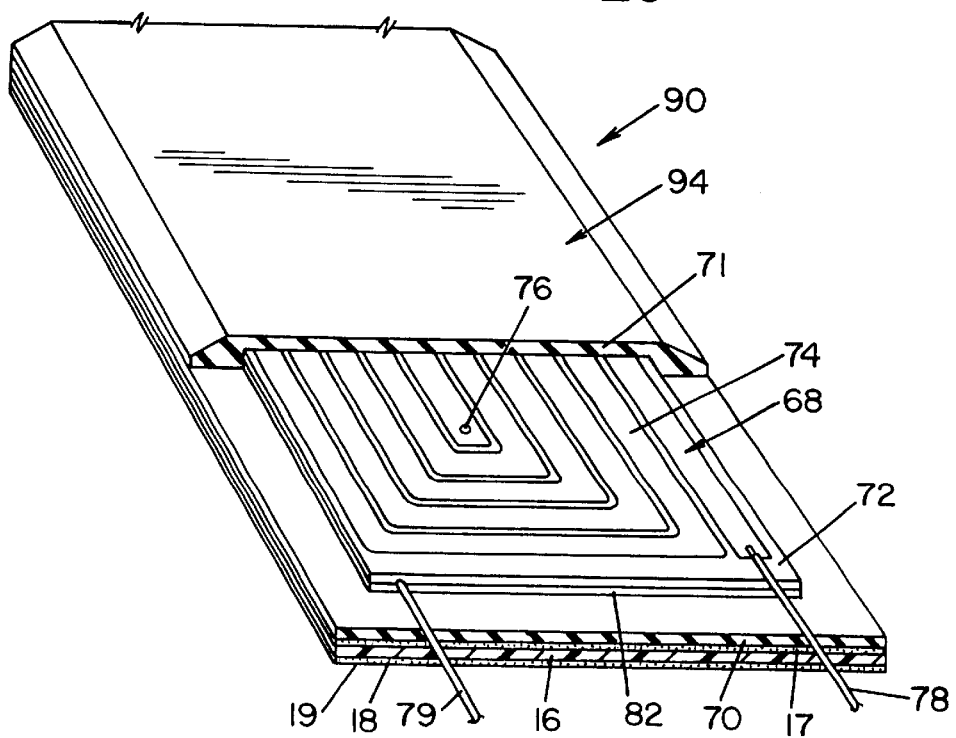
FIG. 2C depicts an electromechanical embodiment according to an aspect of the invention.

Referring to FIG. 2C, a device 90 according to another aspect of the invention comprises an ice protector 94 bonded to the intermediate layer 16 by the intermediate adhesive layer 17. The pressure sensitive adhesive layer 18 is bonded to the intermediate layer 16, and defines the exposed surface 19 that bonds to the aircraft structure. In this embodiment, the ice protector 94 comprises an electromechanical de-icer. An electromechanical de-icer utilizes an electromechanical separation force to deflect an outer surface in a manner that shatters an accreted ice cap into small particles and ejects the particles into a surrounding airstream. Such de-icers are well known in the art. Ice protector 94 utilizes at least one "planar coil" 68 as described in U.S. Pat. No. 5,152,480 to Adams et al. Planar coil 68 comprises a carrier layer 72 and two ribbon coils 74 (only one shown) disposed on either side of carrier layer 72. The coils are electrically connected at the center 76 through the carrier layer 72. Power lead 78 is connected to one of said ribbon coils 74, and power lead 80 is connected to the other of said ribbon coils. A conductive target layer 82 is disposed adjacent planar coil 68. The planar coil 68 and conductive target layer 82 are bonded between a bond-side layer 70 and a breeze-side layer 71. In operation, a high magnitude transient potential is applied across power leads 78 and 79 which generates a high magnitude transient current in ribbon coils 74. The current develops a transient electromagnetic field that develops eddy currents in target layer 82 which develops an opposing transient electromagnetic field. The two fields repel each other which forces the planar coil 68 away from the target layer 82. This type of arrangement is generally known in the art as an "eddy current de-icer." If the de-icer is mounted on a sufficiently conductive surface, the target layer 82 may be eliminated. Examples of eddy current de-icers that may be used in the practice of the invention are presented in the '480 patent, and in U.S. Pat. No. 5,129,598 to Adams et al. and in FIG. 8 of U.S. Pat. No. 5,314,145 to Rauckhorst, III. Bond-side layer 70, breeze-side layer 71, and carrier layer 72 may comprise polymeric material which may or may not be fiber reinforced. Examples of suitable polymeric materials include chloroprene elastomer, polyurethane elastomer, nitrile-phenolic plastic and epoxy plastic. Examples of suitable fiber reinforcements include polyester, carbon or graphite, and polyamide (Nylon® or Kevlar®) fibers, as well as natural fibers such as cotton.

According to another arrangement known in the art, target layer 82 may be replaced by another planar coil substantially similar to planar coil 68. The high magnitude transient potential is simultaneously applied to both coils such that opposite currents develop in each planar coil. The opposite currents generate opposing electromagnetic fields which causes the two coils to forcefully repel each other. This type of arrangement is generally known in the art as an "electro-repulsive de-icer." Examples of electro-repulsive de-icers that may be used in the practice of the invention are presented in the '480 patent. An alternative embodiment of an electro-repulsive de-icer that may be used in the practice of the invention is presented in U.S. Pat. No. 4,875,644 to Adams et al. Other devices known in the art similar to those discussed in relation to FIGS. 2A through 2C may also be used in the practice of the invention. It is not intended to limit the invention to the specific embodiments presented since the invention may be used with any type of flexible ice protector.

Referring again to FIG. 1, the thickness of intermediate layer 16 is preferably 0.05 inch or less, and a thickness within the range from about 0.01 inch to about 0.02 inch is more preferred, with a thickness of about 0.015 inch being most preferred. An intermediate layer thickness of at least 0.005 inch may also be useful in the practice of the invention. A peel strength of at least 13–15 piw (pounds per inch width) is desired between the ice protector 14 and the aircraft structure 12 when tested according to ASTM D 1876-93 "Standard Test Method for Peel Resistance of Adhesives (T-peel Test)" with one inch by six inch samples having a one inch unbonded area at one end in order to provide a starting point for the peel. The intermediate layer 16, intermediate layer adhesive 17, and pressure sensitive adhesive 18 are chosen to obtain the desired peel strength. The peel failure may occur at the intermediate layer adhesive 17, the pressure sensitive adhesive layer 18, or within the intermediate layer 16 as long as the overall peel strength between the ice protector 14 and aircraft structure is at least the desired value.

The intermediate layer 16 is preferably formed from a foamed elastomer having a tensile strength of at least 100 psi, more preferably at least 150 psi, and most preferably at least 190 psi, when measured according to Procedure E of ASTM D 3574-91 "Standard Test Methods for Flexible Cellular Materials—Slab, Bonded, and Molded Urethane Foams." A suitable foamed elastomer may be selected from the group consisting of foamed acrylic elastomer, foamed polyurethane elastomer, foamed silicone elastomer, and foamed chloroprene elastomer. These foamed elastomers share a common property in being compliant, and in having good cohesive strength and environmental resistance. Increasing bulk density and/or tensile strength of the foam may increase the adhesive strength between the ice protector 14 and aircraft structure 12. Though foamed elastomers are suitable in the practice of the invention, other types of compliant layers may be equally suitable. For example, a layer of chloroprene or natural rubber may be suitable for the intermediate layer if the ice protector is constructed from predominantly plastic materials. In such a case, a chloroprene rubber or natural rubber would have a lesser modulus of elasticity, and be more compliant than the ice protector.

A suitable pressure sensitive adhesive may be selected from the group consisting of acrylic pressure sensitive adhesive and rubber based pressure sensitive adhesive. These adhesives share a common property in having suitable bond strengths and environmental resistance. The pressure sensitive adhesive layer 18 may include a support film, such as a polypropylene or polyester support film. Suitable acrylic pressure sensitive adhesives include catalogue number F-9755PC available from the Minnesota Mining and Manufacturing Company, St. Paul, Minn., U.S.A.; catalogue number FasTap™ 1185 UHA™ available from Avery Denison, Painesville, Ohio, U.S.A.; and ARclad® S-7761 available from Adhesives Research, Inc., Glen Rock, Pa., U.S.A. Suitable rubber based pressure sensitive adhesives include catalogue number IB-1200 available from the Morgan Adhesives Company, Stow, Ohio, U.S.A., and catalogue number ARclad® S-6450 available from Adhesives Research, Inc. Other pressure sensitive adhesives having similar properties may also be used in the practice of the invention.

Figure 3:
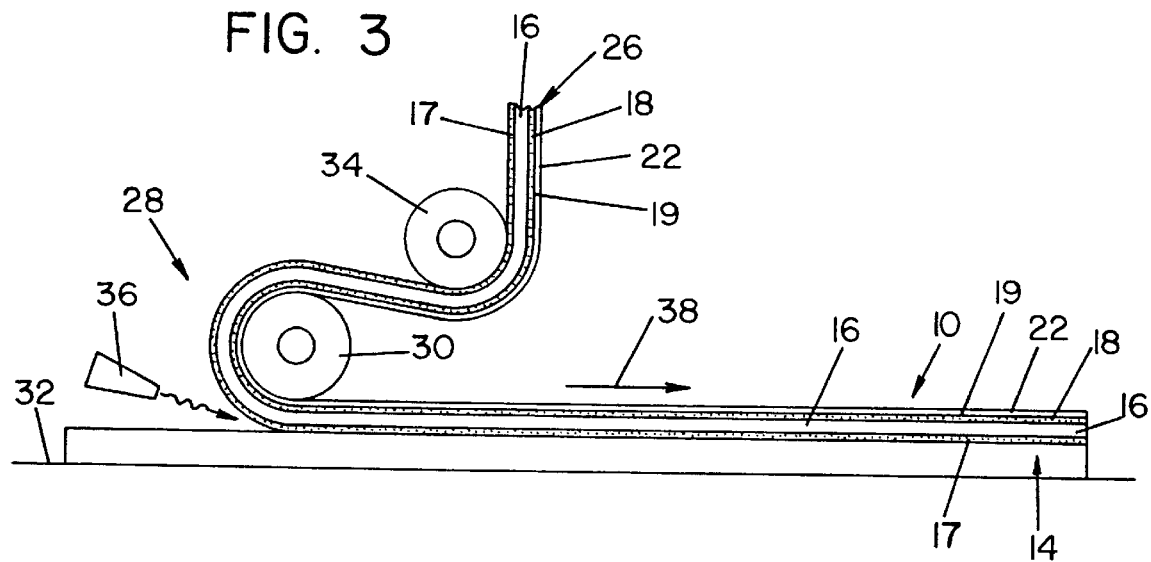
FIG. 3 depicts a method of fabricating a device according to an aspect of the invention.

Referring now to FIG. 3, a method of fabricating the device 10 of FIG. 2B using a laminator 28 is presented. The flexible sheet-like ice protector 14, as previously described, is disposed on a laminator bed 32. The intermediate layer 16, intermediate layer adhesive 17, and the pressure sensitive adhesive layer 18 are preferably provided as a previously cohered layer 26. A preferred material is a gasket bonding tape such as catalogue number 4983 available from the Minnesota Mining and Manufacturing Company of St. Paul, Minn., U.S.A. The 4983 material comprises an acrylic foam layer about 0.04 inch thick with an acrylic pressure sensitive adhesive (a butyl acrylate compound) on one side, designated as catalogue number A-30 available from the same company, and a heat activated hot-melt adhesive (a polyamide resin compound) for bonding to chloroprene rubber on an opposite side of the acrylic foam layer. The acrylic foam layer serves as intermediate layer 16, the heat activated adhesive serves as the intermediate adhesive layer 17, and the acrylic adhesive serves as the pressure sensitive adhesive layer 18. A release layer 22 is bonded to the bonding surface 19 in order to facilitate handling the previously cohered layer 26.

The previously cohered layer 26 is fed through an appropriate feed mechanism which may include a tensioning roller 34. The ice protector 14 and coherent layer 26 are pressed together between a laminator roller 30 and the laminator bed 32. The ice protector 14 and coherent layer 26 are driven in the direction of arrow 38 while the coherent layer 26 is fed to laminator roller 30. Heat is applied to the ice protector and coherent layer 26 which activates intermediate adhesive layer 17 (a heat activated hot-melt adhesive in this example) before the coherent layer 26 and ice protector 14 are fed into the laminator roller 30. In such manner, the coherent layer 26 is continuously bonded to the ice protector 14. In the embodiment presented, the heat is applied by blowing hot air through a nozzle 36 which is arranged to direct the air across the width of the ice protector 14 and coherent layer 26. Radiant heat, open flame, and other known methods of generating heat could also be used to activate the intermediate adhesive layer 17. The FIG. 3 process could also be used to fabricate device 80 of FIG. 2B, and device 90 of FIG. 2C, as well as other devices according to the invention comprising various types of ice protectors. Ice protectors range from a few inches to several feet in width. Preferably, the coherent layer 26 is uniformly heated and bonded to the ice protector 14 across the entire width of the ice protector 14. Other types of adhesives may be used for the intermediate adhesive layer 17, and may involve different application techniques. However, the technique depicted in FIG. 3 is particularly useful with an elastomeric foam intermediate layer 16 since an autoclave cure under heat and pressure for an extended period of time tends to permanently crush a foamed intermediate layer 16.

Figure 4:
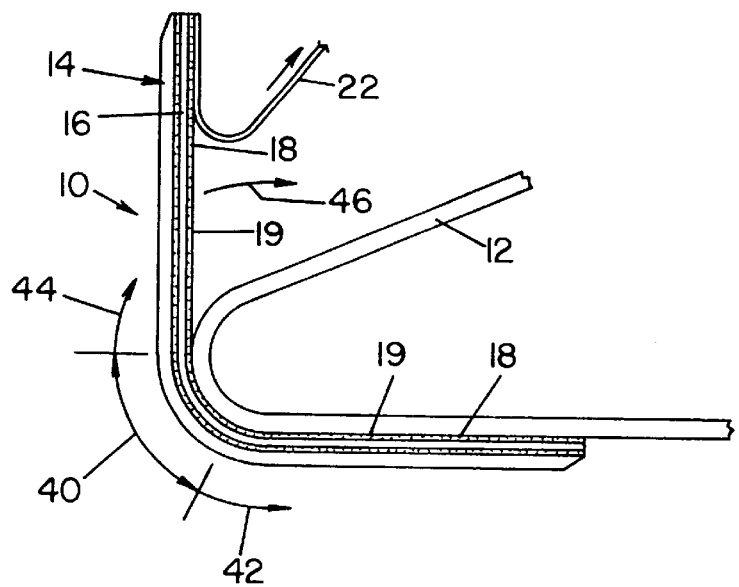
FIG. 4 depicts a method of installing an ice protector according to an aspect of the invention.

Referring to FIG. 4, a method of installing a device 10 according to an aspect of the invention is presented. The device 10 is preferably provided with the intermediate layer 16 and pressure sensitive adhesive layer 18 already bonded to the ice protector 14, and with a release layer 22 bonded to the bonding surface 19 of pressure sensitive adhesive layer 18. The release layer 22 is removed immediately before bonding the bonding surface 19 to the aircraft structure 12. According to a preferred method, the device 10 is bonded to the aircraft structure 12 by first pressing a selected area 40 of the bonding surface 19 (pressure sensitive adhesive) against the aircraft structure 12 and subsequently pressing the bonding surface 19 against the aircraft structure 12 with increasing distance from the selected area 40. In such manner, the bonding surface 19 is first bonded to the aircraft structure 12 in the selected area 40. In the example presented, one side of the ice protector 14 has already been pressed against the aircraft structure 12 with increasing distance from the selected area 40 in the direction of arrow 42. The other side of the ice protector will be forced against the aircraft structure 12 in the direction of arrow 46 as the ice protector 14 is pressed against the aircraft structure 12 with increasing distance from selected area 40 in the direction of arrow 44. In such manner, the bonding surface 19 is bonded to the aircraft structure 12 merely by applying pressure. The selected area 40 is preferably located near an area of maximum curvature, such as a leading edge, in order to facilitate installation. A rubber roller is preferably used to press the ice protector 14 against the aircraft structure 12.

After the ice protector 14 is installed, an edge sealer is preferably applied to the perimeter of the de-icer in order to seal the pressure sensitive adhesive layer 18 and intermediate layer 16 against fluid penetration during service on the aircraft. Penetration of various fluids such as oil, hydraulic fluid, aircraft fuel, and de-icing fluids may degrade the adhesive interface and lead to premature failure. Edge sealers known for use with prior aircraft de-icers find equal utility in the practice of the invention. Examples of such materials include polysulfide fuel tank sealants, polysulfide windshield sealants, polysulfide fairing compounds, fluorelastomer (Viton®) sealants, chloroprene sealants, epoxy sealants and adhesives, and urethane sealants and adhesives. Other materials with suitable sealing characteristics may also be used.

As used herein, the term "flexible" refers to the ability of the ice protector 14 to conform to the shape of the aircraft structure 12. More particularly, "flexible" means that the ice protector 14 can conform to the shape of the aircraft structure 12 with reasonable force and without damage to the ice protector 14. Most ice protectors having a predominantly elastomeric construction inherently have the necessary flexibility.

Further aspects of the invention are demonstrated by the following examples.

EXAMPLE 1

Samples according to a prior art adhesive were prepared as follows. Adhesion samples of sewn-type pneumatic de-icer were prepared by removing the breeze-side layers. Each ice protector sample consisted of a 0.012–0.014 inch thick natural rubber coated square weave nylon fabric layer bonded to a 0.015 inch thick chloroprene rubber layer with an appropriate adhesive and tie-in cement which were cured under heat and pressure in an autoclave, as is well known in the art. Each ice protector sample was bonded to a 0.08 inch thick aluminum strip with a 0.006 inch thick layer of 1300L adhesive (a solvent based chloroprene adhesive).

| | |
|---|---|
| xxxxxxxxxxxxxxxxxx | Coated Nylon Fabric |
| ///////////////// | Rubber layer |
| ****************** | 1300L layer |
| ================== | Aluminum Sheet |

The 1300L was applied as follows: one coat on the ice protector and one coat on the aluminum strip, air dry for one hour, a second coat on the ice protector and a second coat on the aluminum strip, air dry until tacky, lightly press the aluminum strip to the ice protector, and firmly roll the two together with a rubber roller. Each sample was allowed to dry for at least 24 hours and subjected to a 180° T-peel adhesion test between the rubber/fabric layer and the aluminum sheet at various temperatures. The peel tests were conducted according to ASTM D 1876-93 "Standard Test Method for Peel Resistance of Adhesives (T-peel Test)" with one inch by six inch samples having a one inch unbonded area at one end in order to provide a starting point for the peel. Three samples were tested at 32° F. and three samples were tested at –67° F. Average peel strength of each set of three samples at the corresponding temperature is presented in Table 1. The force necessary to separate the samples in a peel failure mode begins with an initially greater force that subsequently drops to a steady lesser force. The initial greater force is designated as "Initial Force" (1 bf= pounds force), and the steady lesser force is indicated as "Peel Strength" (piw=1 bf per inch of sample width)

EXAMPLE 2

Samples according to another prior art adhesive were prepared and tested according to Example 1, except the 1300L layer was replaced by a Bostik catalogue number 1096 chloroprene adhesive and catalogue number 1007 synthetic rubber based primer.

| | |
|---|---|
| xxxxxxxxxxxxxxxxxx | Coated Nylon Fabric |
| ///////////////// | Rubber layer |
| ****************** | Bostik 1096 |
| ------------------ | Bostik 1007 |
| ================== | Aluminum Sheet |

The Bostik 1096 and 1007 were applied as follows: one coat of 1007 on the aluminum strip and one coat of 1096 on the ice protector, air dry for one hour, a second coat of 1096 on the ice protector and one coat of 1096 on the aluminum strip over the primer, air dry until tacky, lightly press the aluminum strip to the ice protector, and firmly roll the two together with a rubber roller. The samples were permitted to dry for a period of at least 24 hours. Average peel data for each set of three samples at the corresponding temperature is presented in Table 1. The Bostik 1007 and 1096 adhesives are available from Bostik Incorporated, Middleton, Mass., U.S.A.

EXAMPLE 3

Samples according to an aspect of the invention were prepared as follows. Adhesion samples were prepared and tested according to Example 1, except the 1300L layer was replaced by a 3M catalogue number 4983 layer. As previously described, the 4983 is comprised of a heat activated adhesive bonded to one side of an elastomeric foam layer (the intermediate layer), and a pressure sensitive adhesive layer bonded to the other side of the foam layer protected by a release layer.

| | |
|---|---|
| xxxxxxxxxxxxxxxxxx | Coated Nylon Fabric |
| ///////////////// | Rubber layer |
| ****************** | 3M 4983 layer |
| ================== | Aluminum Sheet |

The 4983 adhesive was applied as follows: apply heat to the ice protector and to the heat activated adhesive side of the 4983 using a heat gun and immediately pressing the 4983 against the ice protector with a rubber roller, allow the sample to cool, remove the release layer from the pressure sensitive adhesive side of the 4983 and immediately pressing the ice protector against the aluminum strip with a rubber roller. Average peel data for each set of three samples at the corresponding temperature is presented in Table 1.

TABLE 1

| | Temperature | | | |
|---|---|---|---|---|
| | 32° F. | | −67° F. | |
| | Initial Force (lbf) | Peel Strength (piw) | Initial Force (lbf) | Peel Strength (piw) |
| Example 1 | 20.7 | 21.0 | 20.8 | 21.3 |
| Example 2 | 33.7 | 31.0 | 41.0 | 23.0 |
| Example 3 | 40.5 | 31.7 | 36.5 | 20.5 |

This data demonstrates that the Example 3 samples provide essentially equivalent or better adhesion in comparison to the Example 1 and 2 samples.

EXAMPLE 4

A sample was prepared according to a prior art adhesive as follows. A strip was cut from a propeller de-icer similar to that described in U.S. Pat. No. 4,386,749 to Sweet et al. The ice protector sample consisted of a 0.010 chloroprene elastomer breeze-side layer, a 0.016 chloroprene elastomer element carrier layer, a 0.005 inch thick stainless steel element layer, and a 0.010 inch thick chloroprene elastomer bond-side layer. The various layers were bonded together with appropriate adhesives and tie-in cements and cured under heat and pressure in an autoclave, as is well known in the art. The aluminum strip and ice protector sample were each one inch wide and four inches long. Lap shear adhesion samples were formed by bonding the ice protector to the aluminum strip with 1300L, as described in Example 1, with an overlap area about one inch. Thus, the bond area of the samples was about one square inch.

| | |
|---|---|
| xxxxxxxxxxxxxxxxxx | Breeze-Side layer |
| ///////////////// | Carrier layer |
| ------------------ | Element |
| xxxxxxxxxxxxxxxxxx | Bond-Side layer |
| ****************** | 1300L Layer |
| ================== | Aluminum Sheet |

The shear strength of the bond between the bond-side layer and aluminum sheet was tested by clamping the ice protector sample to a fixture inside an oven, raising the sample temperature to 170° F., and hanging a ten pound weight from the from the aluminum strip (which induced an average shear force of 10 psi in the 1300L layer between the ice protector and the aluminum sheet). Creep between the ice protector and the aluminum strip exceeding ⅛ inch within a ten minute period according to this test is unacceptable for an electrothermal propeller de-icer application. The 1300L layer quickly failed upon application of the shear force which resulted in separation of the ice protector from the aluminum sheet.

EXAMPLE 5

A sample was prepared according to Example 4, except the 1300L layer was replaced by an acrylic pressure sensitive adhesive layer, catalogue number A-30 available from the Minnesota Mining and Manufacturing Company. The A-30 adhesive layer was applied by first pressing the adhesive against the bond side layer with a rubber roller, and subsequently pressing the ice protector sample against the aluminum strip using a rubber roller.

| | |
|---|---|
| xxxxxxxxxxxxxxxxxx | Breeze-Side layer |
| ///////////////// | Carrier layer |
| ------------------ | Element |
| xxxxxxxxxxxxxxxxxx | Bond-Side layer |
| ****************** | A-3 Layer |
| ================== | Aluminum Sheet |

After a period of at least an hour, the shear strength of the bond between the bond-side layer and aluminum sheet was tested as described in Example 4. The A-30 layer quickly failed upon application of the shear force which resulted in separation of the ice protector from the aluminum sheet.

EXAMPLE 6

An adhesion sample was prepared and tested as described in Example 4 except the 1300L layer was replaced by a 4983 layer (applied according to Example 3). As previously described, the 4983 layer provides an intermediate layer comprised of an elastomeric foam bonded to the bond-side layer, and a pressure sensitive adhesive layer bonded to the intermediate layer.

| | |
|---|---|
| xxxxxxxxxxxxxxxxxx | Breeze-Side layer |
| ///////////////// | Carrier layer |
| ------------------ | Element |
| xxxxxxxxxxxxxxxxxx | Bond-Side layer |
| ****************** | 4983 |
| ================== | Aluminum Sheet |

The shear strength of the bond between the bond-side layer and aluminum sheet was tested as described in Example 4. The ice protector crept about 1/16 inch relative to the aluminum strip during the ten minute test period, which was well within the maximum allowable creep of 1/8 inch, in direct contrast to the Example 4 and 5 samples. Most of the creep occurred within the foam intermediate layer.

Advantages of the invention are apparent from these examples. At greater temperatures, the acrylic adhesive tested failed when used alone. Presence of the intermediate layer surprisingly and unexpectedly allows the same acrylic adhesive to provide an adequate bond. Resistance to heat is important with any type of ice protector. Providing an intermediate layer having a lesser modulus of elasticity than the ice protector results in the intermediate layer being more compliant than the ice protector. An intermediate layer that is more compliant than the ice protector results in a more uniform bond with uniform and complete contact to the aircraft structure. Attaining uniform and complete contact and an absence of air pockets with only a pressure sensitive adhesive is difficult. The intermediate layer 16 may also provide a tie-in between the adhesive layer 17 that bonds to the ice protector, and the adhesive layer 18 that bonds to the aircraft structure. This permits use of two adhesives, each of which can be specifically adapted to bond to a particular type of surface. Thus, according to an aspect of the invention, the intermediate adhesive layer 17 is specifically adapted to bond the intermediate layer 16 to the aircraft ice protector 14, and the adhesive may vary from one application to the next depending on the composition of the bonded surfaces. Likewise, the pressure sensitive adhesive layer 18 is specifically adapted to bond the intermediate layer to the aircraft structure 12, and may also vary depending on the composition of the bonded surfaces. For example, the 4983 gasket tape has a heat activated adhesive for bonding to chloroprene rubber on one face, and an acrylic pressure sensitive adhesive for bonding to aluminum on the other face. Both adhesives bond well to the intermediate layer.

It is evident that many variations are possible without departing from the scope and spirit of the invention as defined by the claims that follow.

I claim:

1. A device for inhibiting atmospheric ice accumulation on an aircraft structure, comprising:
    a flexible ice protector;
    an intermediate layer bonded to said flexible ice protector, said intermediate layer having a lesser modulus of elasticity than said flexible ice protector;
    a pressure sensitive adhesive layer bonded to said intermediate layer, said pressure sensitive adhesive layer defining a bonding surface that bonds to the aircraft structure.

2. The device of claim 1, wherein said pressure sensitive adhesive layer comprises an adhesive selected from the group consisting of acrylic pressure sensitive adhesive and rubber based pressure sensitive adhesive.

3. The device of claim 1, wherein said intermediate layer comprises a foamed elastomer.

4. The device of claim 3, wherein said foamed elastomer is selected from the group consisting of foamed acrylic elastomer, foamed polyurethane elastomer, foamed chloroprene elastomer, and foamed silicone elastomer.

5. The device of claim 1, wherein said intermediate layer has a thickness less than 0.05 inch.

6. The device of claim 1, wherein said intermediate layer has a thickness within the range of about 0.01 inch to about 0.02 inch.

7. The device of claim 1, wherein said ice protector comprises an elastomeric layer adjacent to said intermediate layer, said intermediate layer being bonded to said elastomeric layer.

8. The device of claim 1, wherein said ice protector comprises a polymeric layer adjacent to said intermediate layer, said intermediate layer being bonded to said polymeric layer.

9. The device of claim 1, wherein said intermediate layer is heat bonded to said ice protector.

10. The device of claim 1, further comprising a release layer bonded to said bonding surface.

11. The device of claim 1, wherein said ice protector comprises a pneumatic de-icer.

12. The device of claim 1, wherein said ice protector comprises an electrothermal heating element.

13. The device of claim 1, wherein said ice protector comprises an electromechanical de-icer.

14. A method for attaching a flexible ice protector to an aircraft structure, comprising the steps of:
    bonding said flexible ice protector to said aircraft structure by means of an intermediate layer bonded to said ice protector, said intermediate layer having a lesser modulus of elasticity than said ice protector and having a pressure sensitive adhesive layer on a side of said intermediate layer opposite said ice protector that bonds said intermediate layer to said aircraft structure.

15. The method of claim 14, further comprising the step of first pressing a selected area of said pressure sensitive adhesive layer against said aircraft structure and subsequently pressing said pressure sensitive adhesive layer against said aircraft structure with increasing distance from said selected area.

16. A device for inhibiting atmospheric ice accumulation on an aircraft structure, comprising:
    a flexible ice protector;
    an intermediate layer disposed between said flexible ice protector and the aircraft structure;
    an intermediate adhesive layer bonding said intermediate layer to said ice protector, said intermediate layer and said ice protector being comprised of different materials adjacent said intermediate adhesive layer;

a pressure sensitive adhesive layer that bonds said intermediate layer to the aircraft structure, said intermediate layer providing a tie-in between said intermediate adhesive layer and said pressure sensitive adhesive layer, thereby providing a stronger overall bond between said flexible ice protector and the aircraft structure than said pressure sensitive adhesive layer alone would provide between said ice protector and the aircraft structure without said intermediate layer and said intermediate layer adhesive.

17. The device of claim 16, wherein said intermediate layer has a lesser modulus of elasticity than said ice protector.

18. The device of claim 16, wherein said intermediate layer has a thickness less than 0.05 inch.

19. The device of claim 16, wherein said intermediate layer comprises material selected from the group consisting of foamed acrylic elastomer, foamed polyurethane elastomer, foamed chloroprene elastomer, and foamed silicone elastomer.

20. The device of claim 16, wherein said pressure sensitive adhesive layer comprises an adhesive selected from the group consisting of acrylic pressure sensitive adhesive and rubber based pressure sensitive adhesive.

* * * * *